(12) United States Patent
Drobnik (10) Patent No.: US 6,219,264 B1
(45) Date of Patent: Apr. 17, 2001

(54) METHOD AND APPARATUS TO REDUCE RECTIFIER LOSS

(75) Inventor: Josef C. Drobnik, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/364,007

(22) Filed: Jul. 29, 1999

(51) Int. Cl.$^7$ .............................. H02M 7/217; H02M 3/24
(52) U.S. Cl. ................................ 363/127; 363/98; 363/37
(58) Field of Search .................... 363/127, 131, 363/132, 21, 56, 37, 98, 89; 323/284, 285, 282

(56) References Cited

U.S. PATENT DOCUMENTS

| 4,519,024 | * | 5/1985 | Federico et al. | 363/127 |
| 4,857,822 | * | 8/1989 | Tabisz et al. | 323/282 |
| 5,014,179 | * | 5/1991 | Latos | 363/56 |
| 5,590,032 | * | 12/1996 | Bowman et al. | 363/15 |

* cited by examiner

Primary Examiner—Peter S. Wong
Assistant Examiner—Rajnikant B. Patel
(74) Attorney, Agent, or Firm—Charles A. Mirho (57) ABSTRACT

A method includes producing a control voltage signal that exceeds a rated maximum control voltage signal level for a switch, and limiting the control voltage signal applied to the switch to no greater than the rated maximum control voltage signal level.

21 Claims, 5 Drawing Sheets

METHOD AND APPARATUS TO REDUCE RECTIFIER LOSS

BACKGROUND

1. Field

The invention relates to the field of electrical power supply and, more particularly, to electronic rectifier circuits.

2. Background Information

Rectifiers circuits are typically employed in electronic power supplies. Rectifier circuits may accept input signal—often an alternating current (AC) signal—and produce an output signal—often a signal with fewer or different AC characteristics. Typically, diodes may be used to implement rectifier circuits. One limitation of diodes is a characteristic known as "forward voltage drop." A diode conducting current may exhibit a voltage differential between its input and output terminals, with a corresponding voltage and power loss. The forward voltage drop characteristic can be problematic, especially in low voltage rectifier implementations. Examples of low voltage applications are applications in which the rectifier output voltage signal is less than ten volts. A forward voltage drop for a typical diode may be approximately 0.6 volts. A voltage drop on the order of 0.6 volts may be acceptable in high voltage rectifier applications (for example, for rectifiers with output voltage signals above ten volts). However, such a drop may become a significant loss factor as rectifier output voltages are reduced to the operating levels employed by some modern digital circuits. Circuits employed in modem personal computers, for example, may have output voltage signals at five volts, two volts, or even sub-volt levels. Such circuits may also be designed to provide 20–50 amps of output current or even greater.

Field effect transistors (FETs) may be employed in rectifier circuits instead of diodes. Employing FETs may reduce losses due to forward voltage drop. FETs may exhibit some forward voltage drop, but this drop is typically significantly lower than the forward voltage drop of a diode. An FET circuit may include a source, a drain, and a gate terminal. A bias voltage signal applied to the gate terminal may result in the FET operating as a closed switch. The bias voltage signal may exceed a bias voltage signal threshold level before the FET will operate as a closed switch. In this mode, the FET is considered "on" and may allow a signal (often in the form of current) to propagate between the source and drain terminals. When the bias voltage signal drops below the bias voltage signal threshold level, the FET may operate, approximately, as an open switch. In this mode the FET is considered "off" and may block signal propagation from source to drain terminals. A gate capacitance is typically associated with the gate terminal of an FET. Energy is typically absorbed by the gate capacitance as the gate voltage signal is increased to the bias voltage signal threshold level. This energy may be quantified by the formula:

$$W=f^*C^*V^2$$

where W is the energy, f is the switching frequency, C is the gate capacitance, and V is the voltage to which the gate capacitor is charged.

Rectifier circuits may comprise a primary stage to which an input voltage signal is applied. Rectifiers may further comprise a secondary stage in which a secondary voltage signal is induced. Induction may occur by way of primary and secondary windings. In schematic diagrams representing such circuits, the direction of the turns on the windings may be indicated by a black dot located proximate to one end of the windings. The design and illustration of rectifiers with primary and secondary stages is well known in the art.

A typical rectifier may employ two FETs in the secondary stage. A first FET conducts a positive cycle of the secondary voltage signal to the output terminals of the rectifier. A second FET conducts a negative cycle of the secondary voltage signal to the output terminals of the rectifier. The resulting output signal of the rectifier may approximate a DC voltage signal. Capacitive effects within the rectifier circuit may further reduce AC components of the output voltage signal. The rectifier may be referred to as a synchronous rectifier when switching of the FETs is accomplished synchronously with the period of the input AC voltage signal, in manners well known in the art. The design and operation of synchronous rectifiers is well known in the art.

A substantial source of rectifier power loss may stem from the "dead-time" of the secondary voltage signal. Dead time is the time during which neither FET is on to conduct the secondary voltage signal to the rectifier output terminals. Dead time is a product of numerous FET characteristics. The gate bias voltage threshold level (the gate bias voltage level which turns the FET on) may have a substantial effect on rectifier dead time. Typical gate bias threshold levels for high-current FETs may range between five and eight volts, although higher or lower gate bias threshold levels are possible as well. As previously described, attaining the gate bias threshold level involves the charging of a gate capacitance, with a corresponding energy consumption. This energy consumption to charge the gate capacitance correlates to a power loss in the rectifier, unless the energy may be recovered when the gate capacitance is discharged. So-called "resonant" circuits recover the power consumed by the gate capacitance, by allowing the gate capacitor to discharge back into the circuit windings, in manners well known in the art.

Some rectifier circuits may employ Schotky diodes to reduce dead time. A Schotky diode may be employed in parallel with the FETs to reduce dead time. Such manners of employing Schotky diodes are well known in the art. The Schotky diodes may add substantial cost to the rectifier circuit. Furthermore, Schotky diodes typically have a threshold voltage level which is exceeded before the diode will conduct a signal from its source terminal to its drain terminal. This threshold voltage level may lead to dead time just as the gate threshold voltage level of FETs may lead to dead time. Furthermore, the Schotky diode may conduct the full current which the FET may conduct during a time when the FET is off and the diode is on, meaning the diode may be rated for high current, making it expensive and possibly large in size. This may mean that large, expensive diodes may be specified for the application. Furthermore, the additional diodes may add capacitance to the rectifier, reducing the frequency response of the secondary stage and increasing power loss.

An ongoing need therefore exists to decrease the dead time when switching FETs, which preserving the resonant character of the switching circuit to reduce power loss.

SUMMARY

In accordance with the present invention, a method includes producing a control voltage signal that exceeds a rated maximum control voltage signal level for a switch, and limiting the control voltage signal applied to the switch to no greater than the rated maximum control voltage signal level.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

The embodiments described herein are merely illustrative, and one skilled in the art will appreciate that numerous modifications may be made which nonetheless fall within the scope of the present invention.

As previously described, the input voltage signal applied to the primary stage winding of a rectifier circuit may induce a secondary voltage signal across a winding in the secondary stage. The peak level of the induced secondary voltage signal may be proportional to the peak level of the primary voltage signal. This proportion may be determined by the ratio of the number of turns in the primary winding to the number of turns in the secondary winding. In other words, $$V^s_{peak} = V^p_{peak} N^s / N^p$$

Figure 1:
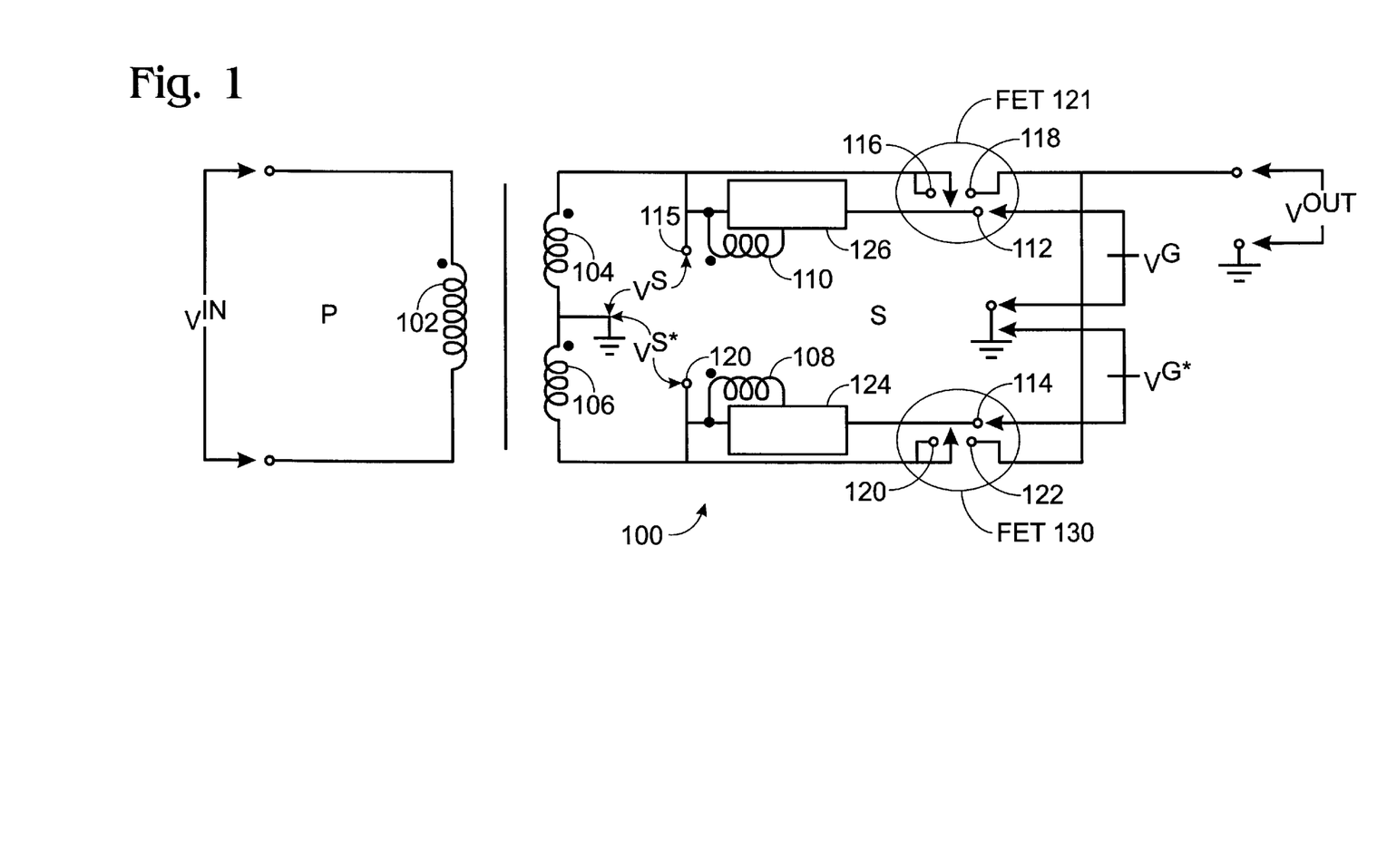
FIG. 1 shows an embodiment of a circuit in accordance with the present invention.

FIG. 1 is a schematic diagram illustrating one embodiment 100 of a rectifier circuit in accordance with the present invention. The circuit comprises a primary stage P and a secondary stage S. Primary stage P comprises primary winding 102. Secondary stage S comprises secondary windings 106, 104 and gate windings 110, 108 (gate windings provide a signal which drives the gates of the FETs). An input voltage signal $V^{in}$ to the primary induces a secondary voltage signal $V^s$ in the secondary. $V^s$ is measured between the source terminal 116 of FET 121 and ground. Another signal $V^{s*}$ may be induced between the source terminal 120 of FET 130 and ground. $V^{s*}$ may be substantially identical to $V^s$, except phase shifted by 180 degrees as described below. The orientation of the secondary windings 104, 106 is indicated by the black dots located at an end of the windings. Winding 104 is oriented in a first direction. This orientation may induce at the source terminal 116 of FET 121 a voltage signal $V^s$ which is proportional to the primary voltage signal $V^{in}$. Winding 106 is oriented in a second direction opposite to the orientation of winding 104. This orientation may induce at source terminal 120 of FET 130 a voltage signal $V^{s*}$ which is proportional to the primary voltage signal $V^{in}$ but shifted by 180 degrees. In other words, the secondary voltage signal $V^{s*}$ induced by winding 106 is positive when the primary voltage signal $V^{in}$ is negative, and negative when the primary voltage signal $V^{in}$ is positive.

Those skilled in the art will appreciate that other circuit topologies are possible as well. For example, the source terminals of each FET may be coupled to the gate terminals of the other FET in the circuit (a design technique known as cross-coupling). Other embodiments may comprise additional primary stages to induce the gate bias voltages, and additional FETs in the secondary stage. Many such circuit modifications are possible and are contemplated within the scope of the present invention.

Note the orientation of the gate windings 108 and 110, as indicated by the black dots located at an end of the windings. Winding 110 is oriented in a first direction. This orientation may induce at the gate terminal 112 of FET 121 a voltage bias signal $V^G$ which is proportional to the primary voltage signal $V^{in}$. Winding 108 is oriented in a second direction opposite to the orientation of winding 110. This orientation may induce at gate terminal 114 of FET 130 a voltage bias signal $V^{G*}$ which is proportional to the primary voltage signal $V^{in}$ but shifted by 180 degrees. In other words, the gate voltage bias signal $V^{G*}$ induced by winding 108 is positive when the primary voltage signal $V^{in}$ is negative, and negative when the primary voltage signal $V^{in}$ is positive.

Thus, the bias voltage signal $V^G$ applied to gate terminal 112 of FET 121 is positive when the primary voltage signal $V^{in}$ is positive. FET 121 is on during the time when the bias voltage $V^G$ at its gate terminal 112 is positive and exceeds the gate bias voltage threshold level for FET 121. The induced secondary voltage $V^s$ applied to the source terminal 116 of FET 121 is also positive while the primary voltage signal $V^{in}$ is positive. Thus FET 121 is on and conducts a positive cycle of the secondary voltage signal $V^s$ to the drain terminal 118 of FET 121 when the primary voltage signal $V^{in}$ is positive. Drain terminal 118 of FET 121 is an output terminal of the rectifier circuit embodiment 100. The gate bias voltage signal $V^{G*}$ applied to gate terminal 114 of FET 130 is positive when the primary voltage signal $V^{in}$ is negative. FET 130 is on during the time when the bias voltage $V^{G*}$ at its gate terminal 114 is positive and exceeds the gate bias voltage threshold level for FET 130. The induced secondary voltage $V^{s*}$ applied to the source terminal 120 of FET 130 is also positive when the primary voltage signal $V^{in}$ is negative. Thus FET 130 is on and conducts a positive cycle of the secondary voltage signal $V^{s*}$ to its drain terminal 122 when the primary voltage signal $V^{in}$ is negative. Drain terminal 122 of FET 130 is also an output terminal of the rectifier circuit embodiment 100. An output voltage $V^{out}$ for the rectifier embodiment 100 is measured between an output terminal and ground.

Limiting circuits 126 and 124 are coupled between the source and drain terminals of the FETs. Reasons for including the limiting circuits 126 and 124 are further described at a later point in this description.

Those skilled in the art will appreciate that while embodiment 100 is implemented using FETs, any switching mechanism responsive to a control voltage (the equivalent of the gate bias voltages in embodiment 100) may be employed within the scope of the present invention. Other possible switching mechanisms, to name just a few, include types of electronic transistors other than PETs, and mechanical switches.

Those skilled in the art will further recognize that the circuit embodiments may retain their resonant characteristics. The limiting circuit may be configured in such a manner that capacitance discharges back into the windings, as further described below.

Figure 2:
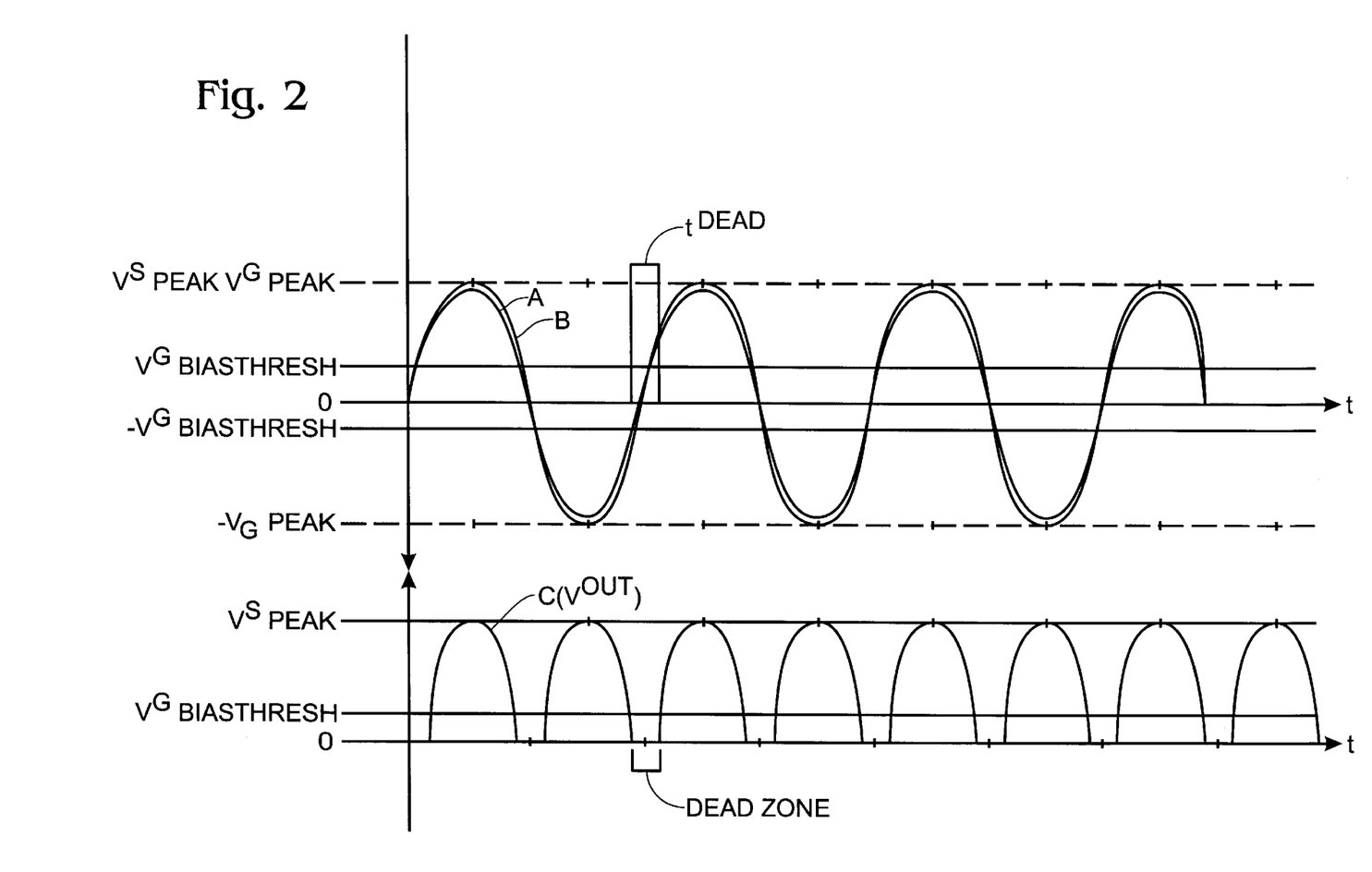
FIG. 2 shows input and output signal embodiments of the circuit embodiment of FIG. 1 in accordance with the present invention.

FIG. 2 is an illustration of example rectifier signals. These signals are illustrated for purposes of comparison and contrast with the signals of FIG. 3. These signals are merely for illustration purposes. Many other rectifier signals are possible including signals with different peak voltage levels, different shapes, and different duty cycles. For example, square wave signals may be employed.

Referring now to FIG. 2, in the particular example shown, the secondary signal (signal A) corresponds to the signal $V^s$ induced at the source terminal of one FET of the rectifier of FIG. 1. Signal A is primarily sinusoidal in shape. Signal A, being periodic, has a frequency defined by its sinusoidal period. The peak voltage level of signal A is labeled $V^s_{peak}$. The points at which signal A crosses the 0-voltage line are called zero crossings. As previously described the amplitude of signal A may be determined from the amplitude of the primary voltage signal $V^{in}$ and the ratio of turns in the primary winding to turns in the secondary winding. Signal B illustrates an induced gate bias voltage $V^G$ at the gate terminal 112 of FET 121. This example signal gate bias signal B in this embodiment is substantially similar to the induced secondary voltage signal A, and, therefore has a peak voltage $V^G_{peak}$ which is approximately the same as $V^s_{peak}$. The signals are similar when the number of turns in secondary winding 104 and gate winding 110 is approximately the same. Also illustrated is the gate bias signal voltage threshold level $V^G_{biasthresh}$ for gate terminal 112 of FET 121. Signal B takes a time $t_{dead}$ to reach the gate bias signal voltage threshold level $V^G_{biasthresh}$ after crossing the zero voltage level. This time $t^{dead}$ represents a time during which FET 121 is off during the positive cycle of the input voltage signal $V^{in}$. The signal description for FET 130 is similar to that of FET 121 above and so is not repeated herein. The one difference, as noted previously, is that FET 130 is on during a negative cycle of input voltage signal $V^{in}$. Otherwise, the signal descriptions for the two FETs are similar.

Signal C represents the example output voltage signal $V^{out}$ which may result from application of signals A and B to the rectifier embodiment of FIG. 1. The dead time $t^{dead}$ of the FETs results in gaps in the rectifier output voltage signal $V^{out}$. One such gap is labeled DEAD ZONE in C. Such gaps may be a substantial source of rectifier power loss. Note that DEAD ZONE is approximately twice as wide as $t^{dead}$ due to the fact that $t^{dead}$ for FET 121 adds with $t^{dead}$ for FET 130 to produce DEAD ZONE.

Figure 3:
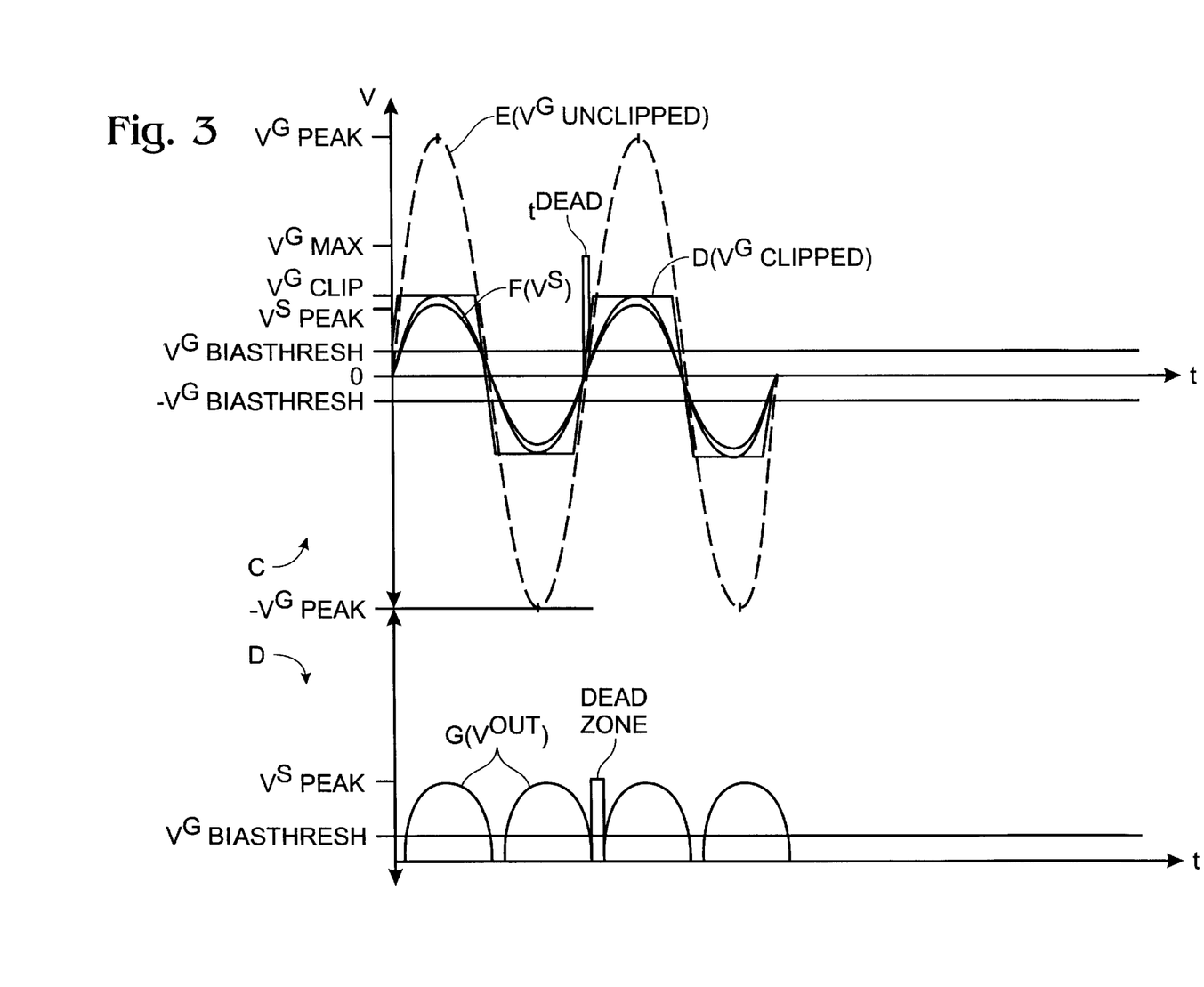
FIG. 3 shows additional input and output signal embodiments of the circuit embodiment of FIG. 1 in accordance with the present invention.

FIG. 3 is an illustration of example rectifier signals in accordance with one embodiment of the present invention. Many other rectifier signals are possible in accordance with the present invention, including signals with different peak voltage levels, different shapes, and different duty cycles. Referring to signal F, the peak voltage level of the induced secondary voltage signal $V^s$ remains the same as in signal A. However, the induced gate bias voltage $V^G$ (signal E) has an increased peak voltage level $V^G_{peak}$ over signal B. The increased peak voltage level exceeds the maximum rated gate bias voltage $V^G_{max}$ for FET 121. Example maximum rated gate bias voltage levels for high-current FETs may fall within the range of eight to eighteen volts, although other levels are possible as well.

This increase in peak voltage level may be accomplished by adjusting the ratio of turns in the primary winding 102 and gate winding 110. To adjust the turn ratios, the number of turns in the primary winding 102 may be increased in proportion to the number of turns in the gate winding 110. For example, to induce a gate bias voltage signal $V^G$ with a peak value $V^G_{peak\ of}$ 100 volts from an input voltage signal Vin with a peak value of 10 volts, the gate winding 110 may be adjusted to have a 100 turns compared to 10 turns in the primary winding 102. In other words, the ratio of primary to gate windings may be 1:10. Adjusting the turn ratio may be accomplished in manners well known in the art to increase the peak gate bias voltage signal level $V^G_{peak}$ without altering the frequency or phase of the gate bias voltage signal $V^G$. Referring to signal E, the peak gate bias voltage signal level $V^G_{peak}$ is now greater than the maximum rated gate bias voltage $V^G_{max}$ for FET 121. However, the gate bias voltage signal $V^G$ never reaches the peak gate bias voltage signal level $V^G_{peak}$ due to limiting of the gate bias voltage signal $V^G$ to a level $V^G_{clip}$ as described below.

The FETs, as previously described, perform a switching function. Thus the FETs in the embodiments described may be thought of as switches. Likewise, the gate bias voltage may be considered a control voltage to turn the switches on or off. The maximum gate bias voltage level for which an FET is rated may be considered as a maximum rated control voltage level for the switch. In accordance with the present invention, the control voltage to the switch is increased to exceed the rated maximum control voltage level for the switch, then limited, when applied to the switch, to a level not exceeding the rated maximum control voltage level.

Of course, those skilled in the art will recognize that other techniques for increasing the peak gate bias voltage signal level $V^G_{peak}$ may be applied as well. For example, a digital or analog amplifier circuit could be applied to the induced secondary signal $V^s$ to produce the desired increase in peak gate bias voltage signal level. In one embodiment, the peak gate bias voltage signal level is adjusted to $V^G_{peak}$ 100 volts.

A limiting circuit 126 may be employed at the gate terminal 112 of FET 121 to limit the bias voltage signal level applied to the gate terminal 112 to a value $V^G_{max}$. The gate bias voltage signal $V^G$ (signal E in FIG. 3) may be limited to prevent the gate bias voltage signal $V^G$ from exceeding the maximum gate bias voltage level $V^G_{max}$ for which the FET 121 is rated. Exceeding this level may result in damage to the FET 121. A limited version of $V^G$ is shown in FIG. 3 as signal D.

As a result of increasing the peak gate bias voltage signal level $V^G_{peak}$ the gate bias voltage signal $V^G$ in signals D and E reaches the gate bias threshold level sooner after the zero crossing than in signal B. As a result, FET 121 is turned on sooner after the bias voltage signal $V^G$ crosses zero. Because the FET is turned on sooner, dead time $t^{dead}$ is reduced. The reduced dead time results in a reduced DEAD ZONE as illustrated in output signal G. The reduced DEAD ZONE may result in reduced rectifier power loss.

The signal description for FET 130 is similar to that of FET 121 above and so is not repeated herein. A difference, as noted previously, is that FET 130 is on during a negative cycle of input voltage signal $V^{in}$.

Note that, in the interest of not obscuring the present invention, the illustrations of the rectifier output signal $V^{out}$ in C and G do not show the influence of circuit capacitive effects on the output signal $V^{out}$. Such circuit capacitive effects, as previously described, may result in an output signal $V^{out}$ which more closely resembles a DC signal.

Figure 4:
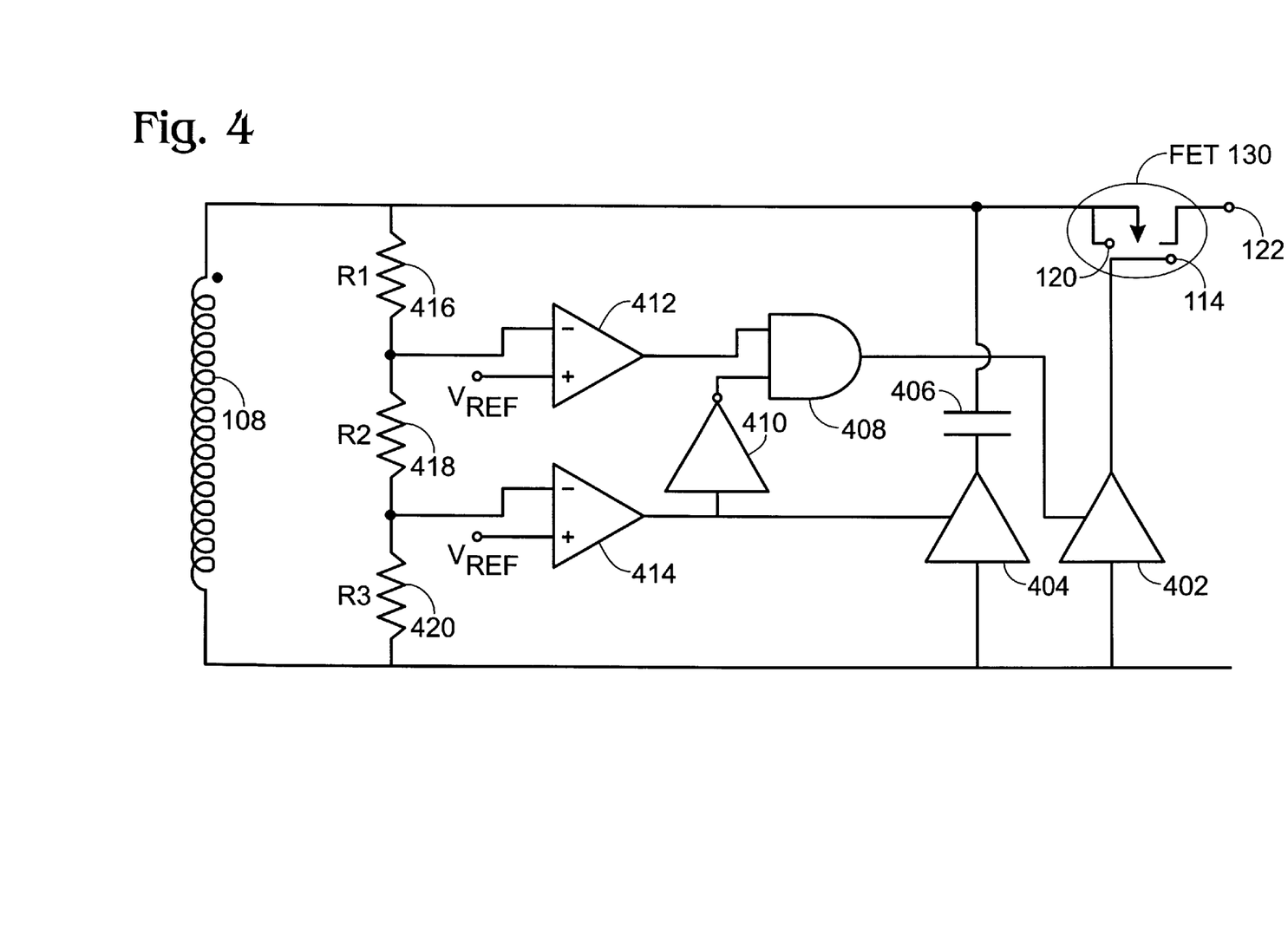
FIG. 4 shows an embodiment of a limiting circuit in accordance with the present invention.

FIG. 4 shows an embodiment of a limiting circuit in accordance with the present invention. As previously described, such a limiting circuit may be coupled to the gate terminal of each FET employed in the rectifier embodiment to limit the peak bias voltage applied to the gate terminal.

Resistors 416, 418, and 420 form a voltage divider in a manner well known in the art. The resistors divide the voltage across the gate winding 108. Voltage to negative terminal of comparator 412 is defined as the following fraction of the gate winding voltage: R1/(R2+R3). Comparator 412 compares this voltage with reference voltage Vref. If Vref is greater, comparator 412 asserts its output. Likewise, voltage to negative terminal of comparator 414 is defined as the following fraction of the gate winding voltage: (R1+R2)/R3. Comparator 414 compares this voltage with reference voltage Vref If Vref is greater, comparator 412 asserts its output. Inverter 410 inverts the output of comparator 414. AND gate 408 inputs the output of comparator 412 and the output of inverter 410. Thus, when output of comparator 412 is asserted and output of comparator 414 is not asserted, AND gate 408 asserts its output This asserted output acts as a signal to turn on switch 402, which connects FET gate terminal 114 to a terminal of gate winding 108. The other terminal of the gate winding 108 is connected to FET source terminal 120. Note that switch 404 is always off when switch 402 is on. Thus the voltage between source and drain of FET 130 is the gate winding voltage during this time.

When the output of comparator 414 is asserted, switch 404 is on. Switch 402 is off, so that capacitor 406 is connected in parallel across gate winding 108. Operation of the circuit embodiment of FIG. 4 is explained in more detail with reference to FIG. 6, which illustrates a simplified diagram of the circuit embodiment of FIG. 4.

Figure 6:
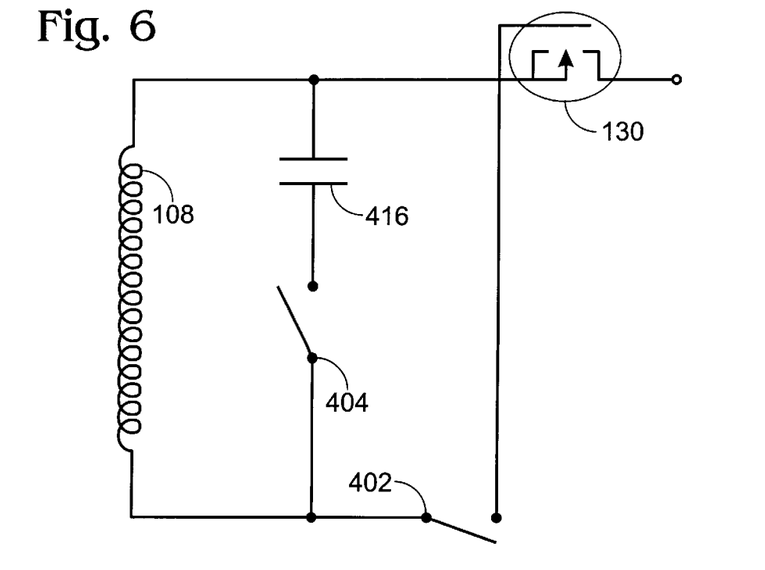

In FIG. 6, proper selection of resistor values in the voltage divider enables switch 402 to connect the gate terminal of the FET 130 to the gate windings while the gate winding voltage is within the operational limits of the FET 130. When the gate winding voltage exceeds the operational limits of the FET 130, switch 402 opens and switch 404 connects the capacitor in parallel across the gate winding 108. This preserves the resonant character of the circuit. The voltage levels at which switches 402 and 404 switch on may be selected by way of the values of resistors R1 416, R2 418, and R3 420 in manners well known in the art.

Figure 5:
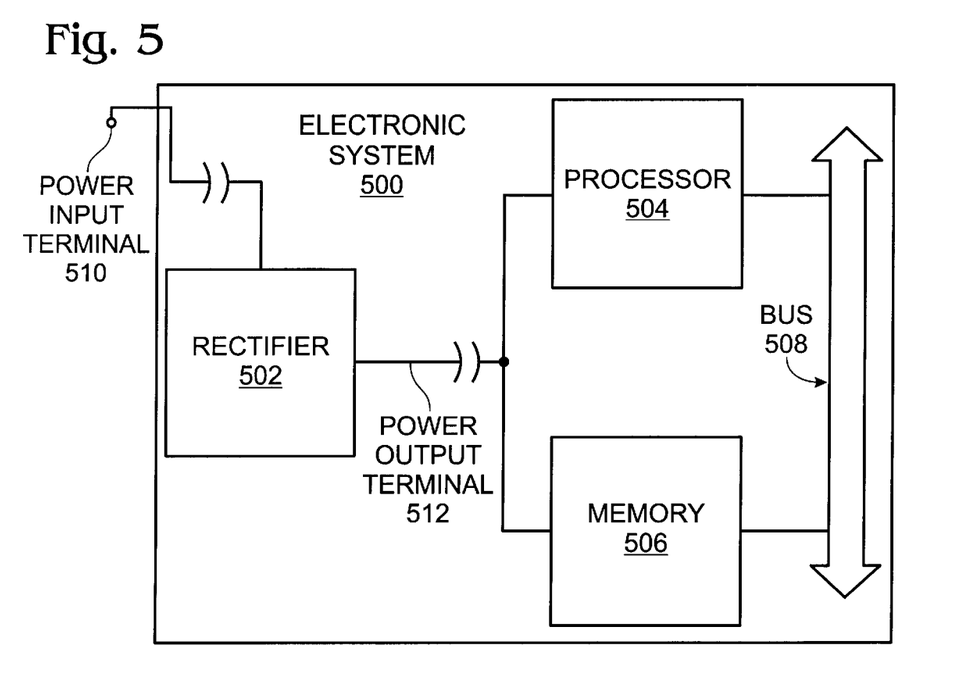
FIGS. 5 & 6 shows an electronic system embodiment in accordance with the present invention.

FIG. 5 shows an embodiment 500 of an electronic system in accordance with the present invention. Virtually any electronic system which accepts an first signal to produce a second signal using a switch, may employ an embodiment of the present invention. The second signal may typically be employed to power system components, such as processor and memory in embodiment 500. Processor 504 and memory 506 are shown coupled by a bus 508, to illustrate an electronic system 500 which performs data processing. However, the invention is in no way limited to data processing systems. An embodiment of the present invention may be employed with rectifier 502 to receive an s AC input signal from power input terminal 510. Rectifier 502 may produce an approximately DC output signal at power output terminal 512. Those skilled in the art will appreciate that rectifier 502 employing an embodiment of the present invention may comprise only one of multiple stages of a complete power system for electronic system 500. Other circuits may be employed between power input terminal 510 and rectifier 502, and between power output terminal 512 and other system components such as memory 506 and processor 504. Such other circuits, in cooperation with rectifier circuit employing the invention embodiment, may comprise a complete power system for electronic system 500.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:
   providing a control voltage to apply to a switch in a rectifier, the control voltage having a peak level preselected to exceed a rated maximum control voltage level for the switch, the amount by which the control voltage is to exceed the rated maximum control voltage level for the switch preselected to reduce a dead time of the switch; and
   limiting the control voltage applied to the switch to no greater than the rated maximum control voltage level for the switch.

2. The method of claim 1 in which producing a control voltage signal to a switch further comprises:
   producing a bias voltage signal to a gate terminal of a field effect transistor.

3. The method of claim 1 in which producing a control voltage signal to a switch further comprises:
   inducing the control voltage signal from an input signal to a rectifier.

4. The method of claim 1 in which limiting the control voltage signal further comprises:
   clipping the control voltage signal to a level less than or equal to the rated maximum control voltage signal level.

5. The method of claim 3 in which limiting the control voltage signal further comprises:
   limiting the control voltage signal in a manner which preserves the resonant characteristic of the rectifier.

6. The method of claim 3 further comprising:
   inducing a secondary voltage signal from an input signal to the rectifier, the secondary voltage signal to be applied to a source terminal of the switch and to be switched to an output terminal of the switch when the control voltage signal reaches a control threshold level.

7. A circuit comprising:
   a limiting circuit;
   a switch comprising an input terminal, an output terminal, and a control terminal; and
   a voltage source coupled to the control terminal and to the limiting circuit, the voltage source to provide a control voltage to the control terminal, the control voltage having a peak level preselected to exceed a rated maximum control voltage level for the control terminal, the amount by which the control voltage is to exceed the rated maximum control voltage level preselected to reduce a dead time of the switch.

8. The circuit of claim 7 in which the switch further comprises:
   a field effect transistor.

9. The circuit of claim 8 in which the control terminal further comprises:
   a gate terminal of the field effect transistor.

10. The circuit of claim 9 in which the control voltage signal further comprises:
    a gate bias voltage signal.

11. The circuit of claim 7 further comprising:
    a first winding to induce the control voltage signal from an input signal to the circuit.

12. The circuit of claim 7 in which the limiting circuit further comprises:
    a clipping circuit to limit the control voltage signal to a level less than or equal to the rated maximum control voltage signal level.

13. The circuit of claim 11 further comprising:
    a second winding to induce the input signal from a primary input signal to a primary stage of the circuit.

14. The circuit of claim 11 in which the limiting circuit includes a capacitor switched in parallel with the first winding to preserve the resonant characteristics of the circuit.

15. An electronic system comprising:
    a first input terminal to receive a first input signal;
    a plurality of electronic circuits to receive a second input signal;

a rectifier circuit to convert the first input signal to the second input signal, the rectifier circuit comprising
a limiting circuit;
a switch comprising an input terminal, an output terminal, and a control terminal; and
a voltage source coupled to the control terminal and to the limiting circuit, the voltage source to provide a control voltage to the control terminal, the control voltage having a peak level preselected to exceed a rated maximum control voltage level for the control terminal, the amount by which the control voltage is to exceed the rated maximum control voltage level preselected to reduce a dead time of the switch.

16. The system of claim 15 in which the switch further comprises:
a field effect transistor.

17. The system of claim 16 in which the control terminal further comprises:
a gate terminal of the field effect transistor.

18. The system of claim 17 in which the control voltage signal further comprises:
a gate bias voltage signal.

19. The system of claim 15 in which the rectifier circuit further comprises:
a first winding to induce the control voltage signal from the AC input signal.

20. The system of claim 19 in which the rectifier circuit further comprises:
a second winding to induce the input signal from the AC input signal.

21. The system of claim 19 in which the limiting circuit includes a capacitor switched in parallel with the first winding to preserve the resonant characteristics of the rectifier.

* * * * *

UNITED STATES PATENT AND TRADEMARK OFFICE
CERTIFICATE OF CORRECTION

PATENT NO. : 6,219,264 B1
DATED : April 17, 2001
INVENTOR(S) : Josef C. Drobnik

It is certified that error appears in the above-identified patent and that said Letters Patent is hereby corrected as shown below:

<u>Title page,</u>
Item [75], reads "Joseph C. Drobnik", should be -- Josef C. Drobnik --

Signed and Sealed this

Sixth Day of November, 2001

Attest:

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.     : 6,219,264 B1
DATED          : April 17, 2001
INVENTOR(S)    : Drobnik

It is certified that error appears in the above-identified patent and that said Letters Patent is hereby corrected as shown below:

Column 1,
Line 30, delete "modem", insert -- modern --.

Signed and Sealed this

Thirteenth Day of August, 2002

*Attest:*

*Attesting Officer*

JAMES E. ROGAN
*Director of the United States Patent and Trademark Office*